United States Patent [19]

Fletcher et al.

[11] 3,715,723

[45] Feb. 6, 1973

[54] FREQUENCY DIVISION MULTIPLEX TECHNIQUE

[76] Inventors: James C. Fletcher, Administrator of the National Aeronautics and Space Administration in respect to an invention of; Hans Brey, Route 1, Box 88, Huntsville, Ala. 35810

[22] Filed: Dec. 28, 1971

[21] Appl. No.: 212,921

[52] U.S. Cl. .........340/146.1 C, 340/147 R, 340/163

[51] Int. Cl. .........................G08b 25/00, G08c 25/00

[58] Field of Search ........340/146.1 C, 147 R, 147 B, 340/147 C, 149, 150, 163, 213; 179/15 AE

[56] References Cited

UNITED STATES PATENTS

| | | | |
|---|---|---|---|
| 3,252,138 | 5/1966 | Young | 340/146.1 C |
| 3,270,321 | 8/1966 | Berkowitz | 340/147 C |
| 3,594,500 | 7/1971 | James et al. | 340/147 C |
| 3,629,831 | 12/1971 | Mikus et al. | 340/147 C |
| 3,670,303 | 6/1972 | Dame | 340/147 C |

*Primary Examiner*—Charles E. Atkinson
*Attorney*—James O. Harrell et al.

[57] ABSTRACT

A system for monitoring a plurality of condition responsive devices. It consists of a master control station and a remote station. The master control station includes a channel select means, a BCD to binary converter, a parity generator, a storage register, a comparator, a plurality of sources of identifying frequencies, an oscillator driver, and a transmitter. The remote station includes a bank of filters for separating the transmitted signals, a detector, a driver, a parity correlator, a command verification and command reset circuit, a storage register, a random access multiplexer, a plurality of identifying frequency sources, an oscillator driver, and a transmitter. The master control station is capable of transmitting command signals which includes a parity signal to a remote station which transmits the signals back to the command station so that such can be compared with the original signals in order to determine if there are any transmission errors. The system utilizes frequency sources which are 1.21 multiples of each other so that no linear combination of any harmonics will interfere with another frequency.

4 Claims, 8 Drawing Figures

INVENTOR
HANS BREY

BY James O. Harrell
ATTORNEY

INVENTOR
HANS BREY
BY
James E. Harrell
ATTORNEY

INVENTOR
HANS BREY
BY James A. Harrell
ATTORNEY

INVENTOR
HANS BREY
BY
James C. Hassell
ATTORNEY

INVENTOR
HANS BREY
BY James O. Harrell
ATTORNEY

INVENTOR
HANS BREY

BY James O. Harrell

ATTORNEY

INVENTOR
HANS BREY
BY James O. Harrell
ATTORNEY

INVENTOR
HANS BREY
BY James O. Harrell
ATTORNEY

FREQUENCY DIVISION MULTIPLEX TECHNIQUE

The invention described herein was made in performance of work under a NASA contract, and is subject to the provisions of Sections 305 of the National Aeronautics Space Act of 1968, Public Law 85-568 (72 stat. 435, 402 U.S.C.P. 2457).

The invention relates to a system for monitoring a plurality of condition responsive devices, and more particularly to a system which is capable of transmitting command signals to condition responsive devices coupled to channels in a remote station and receiving signals therefrom to be checked with the command signal for determining if transmission errors occur.

One of the problems involving checking out systems associated with space vehicles, such as hydrogen tanks, refueling of tanks, etc., is that particularly during the launch, environmental disturbances occur that can create false command signals. It is important that the operator at a master control station know that the command signal sent to the remote station be received in its true form. It is also important to have a system wherein false signals which may be created are not executed.

The system constructed in accordance with the present invention is presently being used as part of a safety system that monitors hazardous conditions at a Saturn V launch complex. The system selects and displays analogue data from remote stations hereinafter referred to as hydrogen hazards monitoring systems of a launch complex. Each system consists of one master control station and five hydrogen hazard multiplexers. Each master control station has five multiplexer control sections and can independently select and record simultaneously one of up to sixty channels from each hydrogen hazards multiplexer. Data is recorded by a multipen graphic recorder. Except for the number of channels available, the hydrogen hazards multiplexers are identical and each can be expanded to sixty channels by the addition of multiplexer cards. Each hydrogen hazards multiplexer has it multiplexers controlled and monitored over two pairs of twisted pair telephone lines. Commands are tone coded bursts with each tone represents a 1 in a binary number. Absence of a tone represents a 0. Frequency modulation techniques are used for data transmission.

Several features are incorporated in the system to insure its safe and reliable operation. Channel select commands are not transmitted until after the channel select switches are positioned, avoiding the display of false data. Provisions are also incorporated to minimize the effects of noise or transients on channel selection. Once a channel is selected, it is almost impossible to accidentally switch channels. The bits comprising commands are transmitted in parallel eliminating both timing circuits and serial to parallel converters. In addition, a parity check is performed on each command and correct parity must be obtained before the command is executed. Channel verification is made by decoding the actual logic levels that turn on the selected channel. Frequency modulation is used for data transmission since it is virtually uneffected by noise or transients. In addition, all circuits are isolated from ground and the master control circuit is completely isolated from the hydrogen hazards multiplexers. Both manual and automatic sequential modes of operation are available.

In accordance with the present invention, it has been found that difficulties encountered in transmitting the command signals to remote stations may be overcome by providing a novel system. This system includes the following basic parts: (1) a plurality of channels each being connected to a respective condition responsive device, (2) a master control station including a channel select means, (3) a BCD binary converter, a parity generator, a first oscillator driver, a plurality of identifying sending frequency sources, a master control transmitter, and means for coupling the output of the binary converter and a parity signal to the master control transmitter for transmitting a frequency multiplex signal to a remote station, (4) a remote station receiving the multiplex signals from the master control transmitter comprising a receiver, a first bank of filters, a first detector, a random access multiplexer, means for supplying the received binary signals from the detector to the random access multiplexer, a second oscillator driver, a plurality of identifying frequency sources, a remote station transmitter, and means for supplying the received binary signal from the detector to the oscillator driver for gating frequencies determined by the received binary number to the remote station transmitter for transmission back to the master control station, (5) means included in the master control station for receiving and recording the information transmitted back from the remote station transmitter, and (6) means included in the master control station for converting the information received from the remote station to a return binary number and comparing the returned binary number with the initial binary number for determining if an error occurred during transmission.

Accordingly, it is an important object of the present invention to provide a system for monitoring a plurality of condition responsive devices which minimizes error in transmission and receiving of signals.

Another important object of this invention is to provide a system which is capable of being operated in disturbed environments which minimizes the chances of false signals being transmitted.

Another important object of the present invention is to provide a system which utilizes a plurality of predetermined frequency sources as binary numbers that make up the command signals being transmitted so that harmonics of the frequencies cannot be combined to produce false data.

Another important object of the present invention is to provide a system wherein verification of each command transmitted is performed prior to initiating a subsequent command.

Other objects and advantages of this invention will become more apparent from a reading of the following detailed description and appended claims taken in conjunction with the accompanying drawings wherein:

Figure 4:
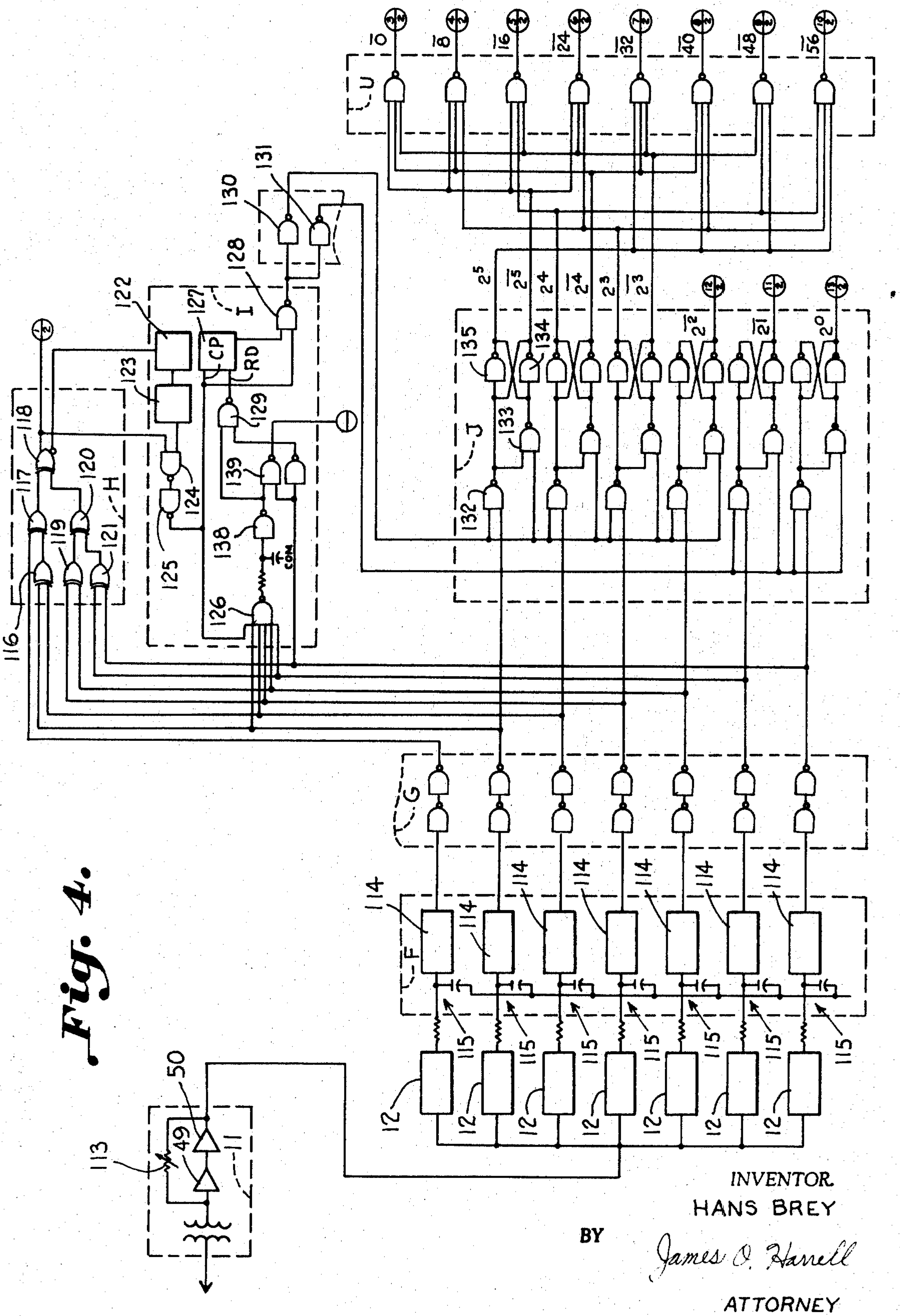
Figure 4A:
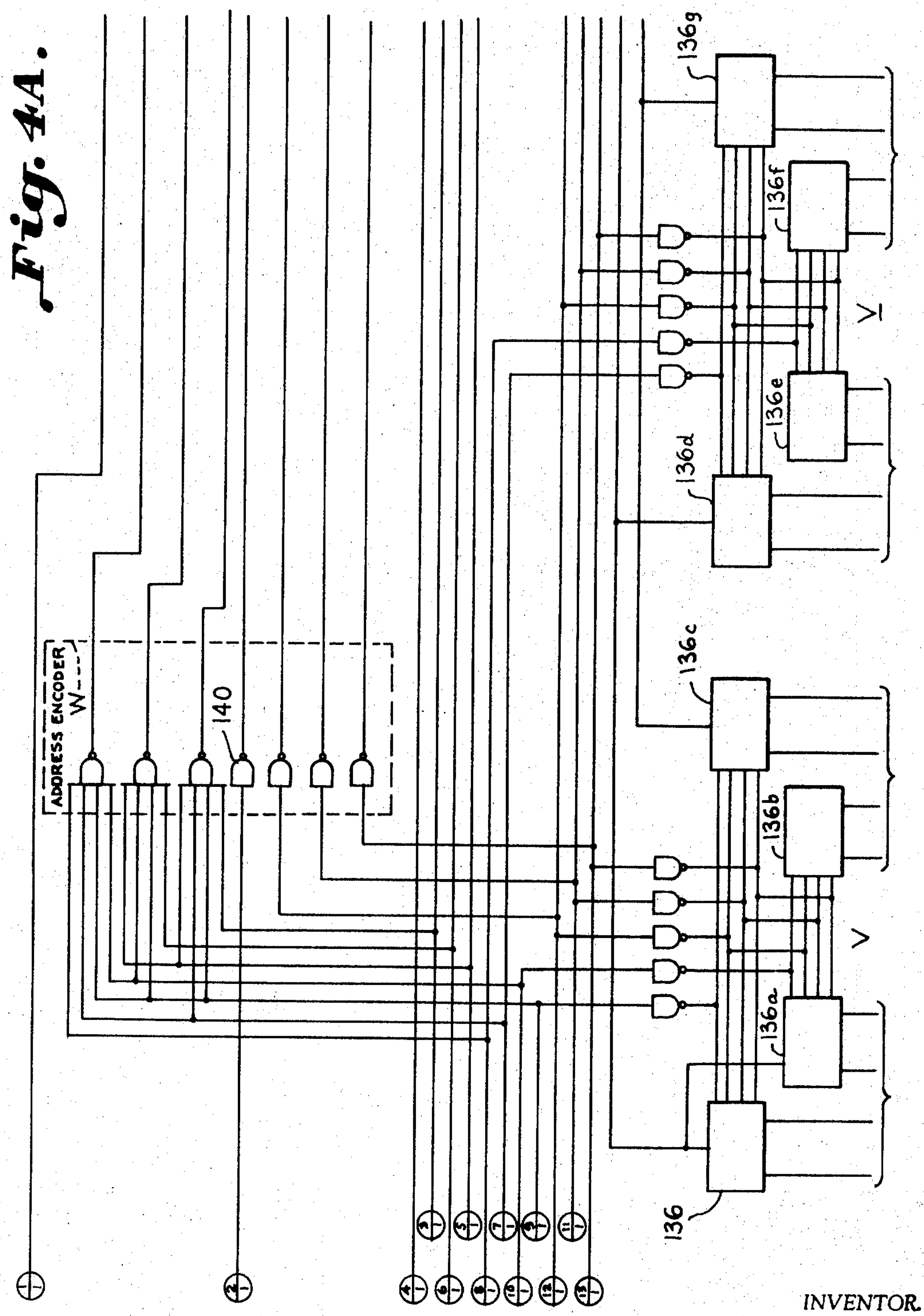
Figure 4B:
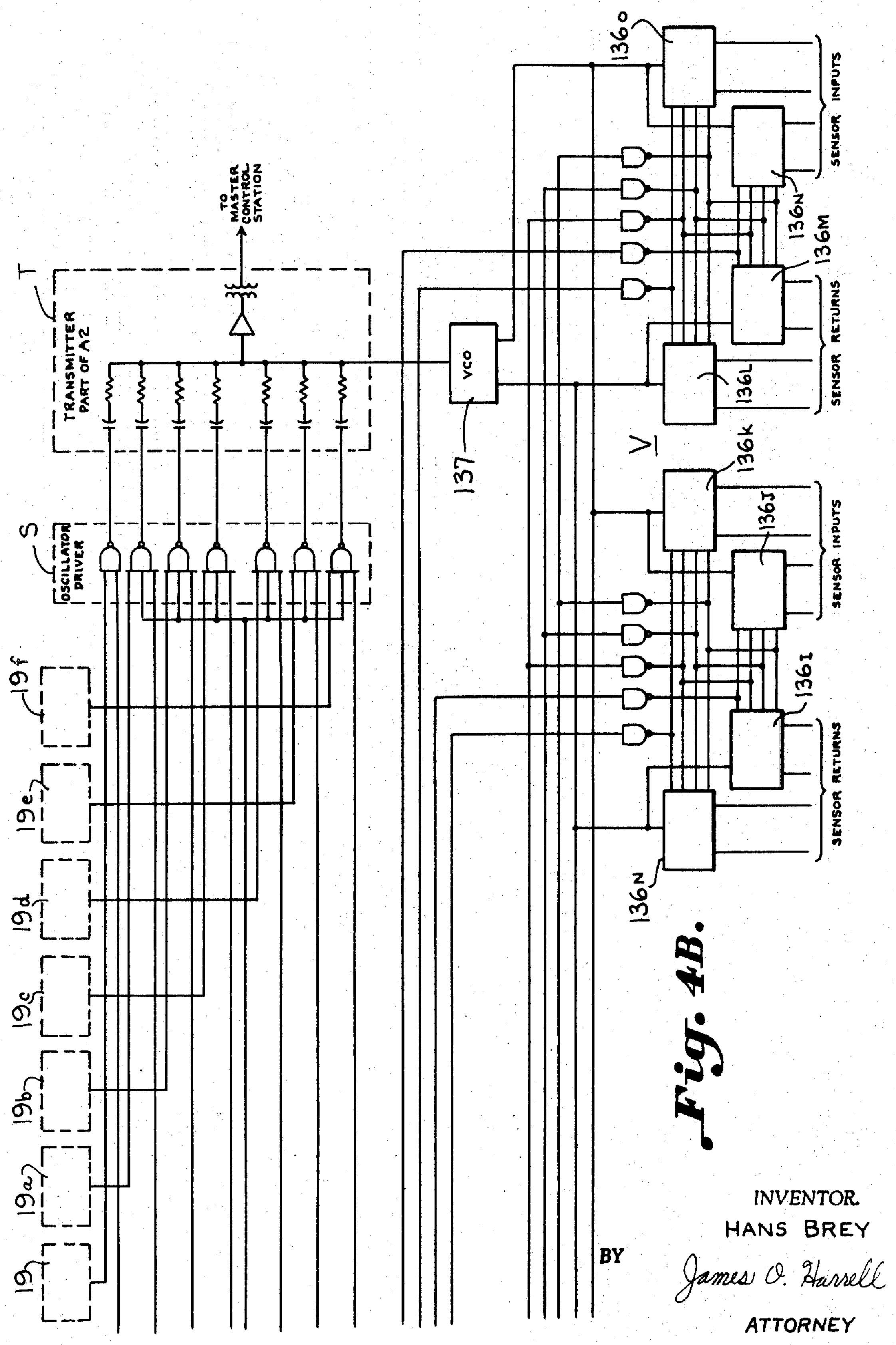

FIGS. 4, 4A, and 4B are a detailed logic diagram for the hydrogen hazards multiplexer.

Figure 1:
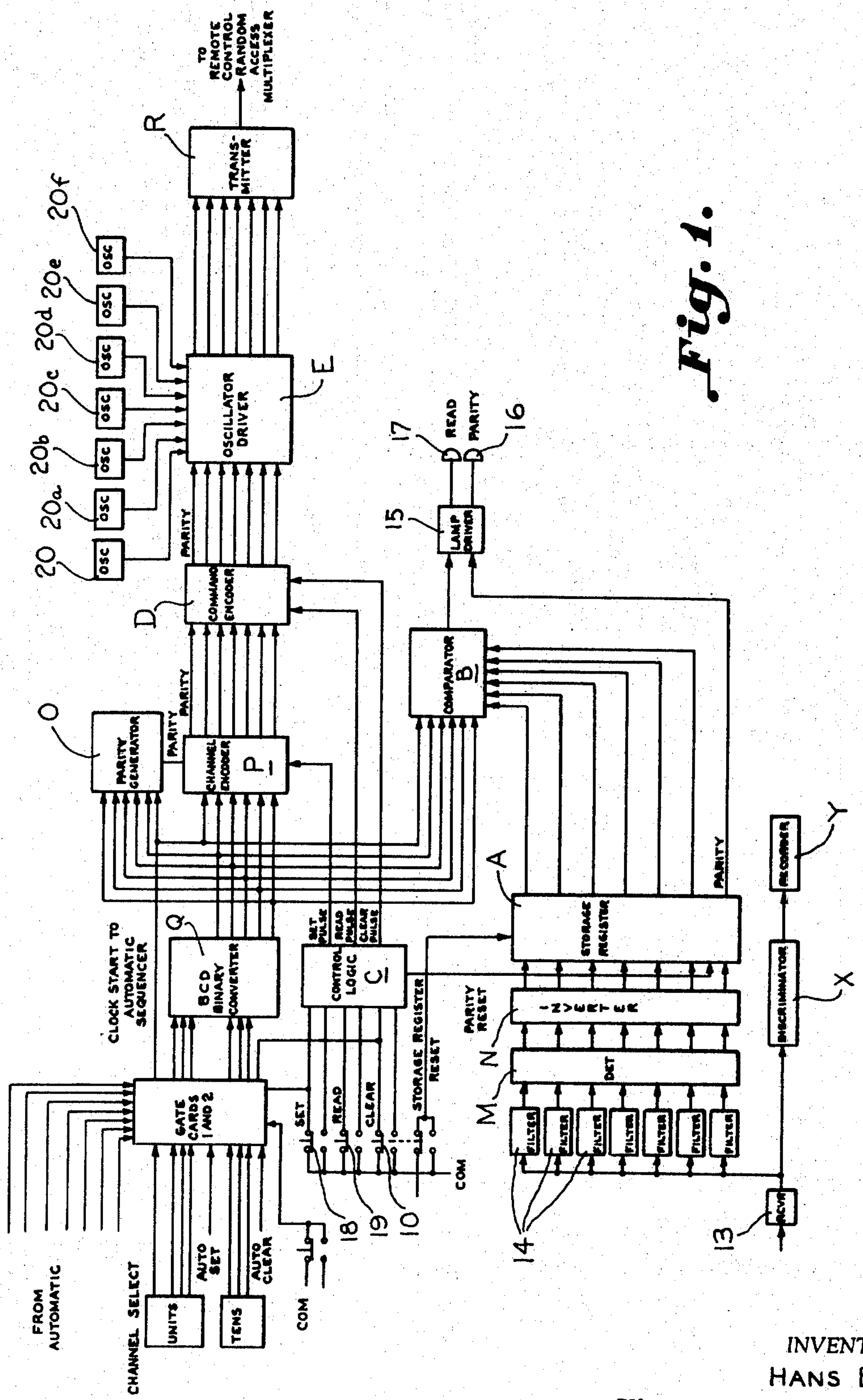
FIG. 1 is a block diagram of the master control station.
Figure 2:
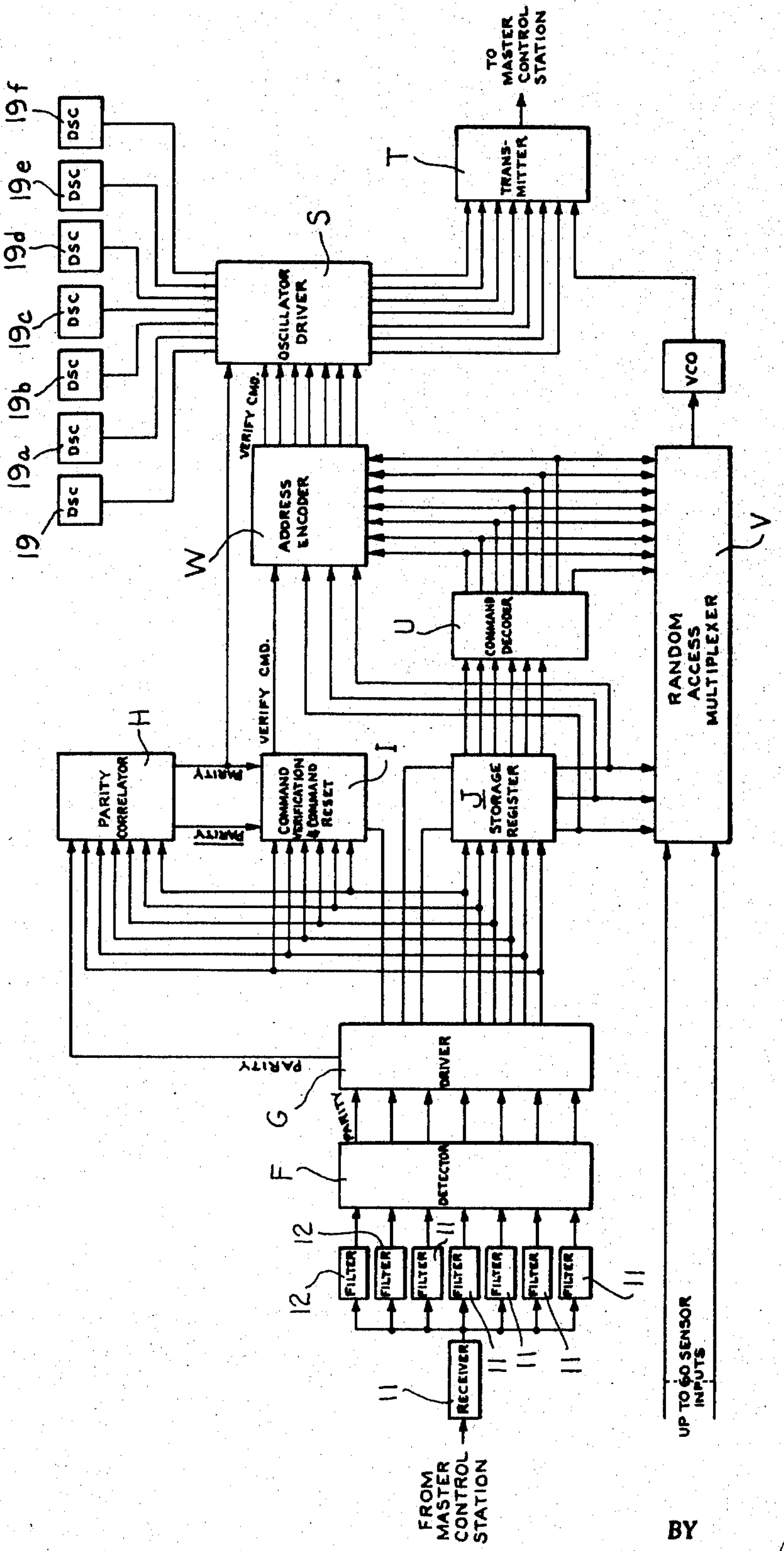
FIG. 2 is a block diagram of the hydrogen hazards multiplexer.

Referring to the block diagrams of FIGS. 1 and 2, since each master control station has five identical multiplexer control sections, and since the hydrogen hazards multiplexers are identical except for the number of channels, the function of only one multiplexer control station and one hydrogen hazards multiplexer are described. The various functions are traced through the system in sequence of normal operation. Commands are initiated at the master control station from the appropriate multiplexer control section.

First, the clear function will be described. The clear command is a 500-ms multitone burst and is initiated by depressing a clear switch 10 (FIG. 1). One section of the clear switch 10 clears or resets a storage register A, applying all "ones" to a comparator B. The output of the other section of the clear switch 10 generates clear and parity reset pulses in a control logic circuits C. The parity reset pulse resets a parity flip-flop located in the storage register A, while the clear pulse is sent to a command encoder D to generate the binary form (111110) of the clear command. At this time, the parity bit is at the 0 level. This command is then routed to an oscillator driver E where it gates through tones comprising the binary number. The presence of the tone indicates a 1 while the absence of the tone indicates a 0. These tones (9.3, 7.6, 6.3, 5.2, and 4.25 kHz) are then transmitted to the hydrogen hazards multiplexer illustrated in FIG. 2.

The clear command is received at the hydrogen hazards multiplexer shown in FIG. 2 by the receiver 11 and routed in parallel to seven filters 12. Each tone is extracted by the appropriate filter and changed to a dc level by a detector F. For a 0 the output of the detector F is zero. This bits (111110) are then routed through the driver G to a parity correlator H, command verification and command reset I, and storage register J. The parity correlator H generates a parity output if there is no single bit error in the command. This output gates the 11.5-kHz tone through an oscillator driver S for transmission by a transmitter T back to the master control station. The parity and $\overline{\text{parity}}$ outputs are applied to the command verification and command reset I, where, in conjunction with the clear command they generate a strobe pulse. This strobe pulse is routed to the driver G which produces two strobe pulses to the storage register J. These strobe inputs read the clear command into the storage register J; however, the outputs of the storage register J are not used at this time.

The 11.5-kHz tone is received by a receiver 13 in the master control station (FIG. 1) filtered by a bank of filters 14, detected by the detector M, inverted by an invertor N and applied to a flip-flop (previously reset by the parity reset pulse) located in the storage register A. The output of the flip-flop is applied to a lamp driver 15, illuminating a set light 16 labeled parity. This indicates that there is no single bit error in the clear command.

The next phase of operation to be discussed is channel selection. Channel selection is accomplished by setting channel select switches 16 illustrated in FIG. 1 to the desired channel. Each switch (tens and units) produces an electrically coded output for each position. The $2^0$ output from the unit switch 16 is sent directly to a parity generator O, channel encoder P, and the comparator B. The other outputs are converted to the $2^5$, $2^4$, $2^3$, $2^2$ and $2^1$ bits in the BCD/binary convertor Q. These bits form the initial binary number for the channel selected and are applied to the parity generator O, channel encoder D and comparator B.

The parity generator O generates a 1 if the binary number has an even number of "ones" and is 0 for an odd number of "ones". The parity bit is also applied to the channel encoder P. At this time the binary number and parity bit are not gated through the channel encoder P. The channel select command along with all "ones" from the comparator extinguish a read indicator light 17.

The next function to be discussed is the set function. The initial binary number and parity bit are transmitted by the transmitter R to the hydrogen hazard multiplexer forming the remote station by depressing a set switch 18. The control logic circuits C generate a set pulse which gates the initial binary number and parity bit through the channel encoder P and a parity reset pulse to reset the parity flip-flop located in the storage register A. At this point, the output is actually the complement of the initial binary number and parity bit. The complement is then gated through the command encoder D producing the binary number and parity bit at its output. The outputs of the command encoder gate through the appropriate tones for the 500-ms transmission to the hydrogen hazards multiplexer illustrated in FIG. 2. The parity tone is transmitted only if the parity bit is a 1.

The multitone transmission is received by the receiver 11 of the hydrogen hazards multiplexer (FIG. 2). Again the tones are extracted by filters 12, detected by detector F and applied by the driver G to the parity correlator H, command verification and reset circuit I and storage register J.

The parity and $\overline{\text{parity}}$ outputs are produced if there is no single bit error, and are applied to the command verification and command reset circuit I and driver G to generate two strobe output pulses. The parity output is also sent to an oscillator driver S where it gates through a (11.5 kHz) tone from the oscillator frequency source 19 comprising one of the oscillator frequency sources 19 through 19F to a remote station transmitter T. The strobe outputs from the driver G are sent to the storage register J where they read in channel select command.

The $2^5$, $\overline{2^5}$, $2^4$, $\overline{2^4}$, $2^3$ and $\overline{2^3}$ outputs are sent to a command decoder U to obtain the $\overline{0}$, $\overline{8}$, $\overline{16}$, $\overline{32}$, $\overline{40}$, $\overline{48}$ and $\overline{56}$ outputs. These outputs turn on a pair of one out of eight decoders in random access multiplexers D. These outputs are also decoded in an address encoder to obtain the $2^5$, $2^4$, and $2^3$ bits of the channel select commands. The $\overline{2^2}$, $\overline{2^1}$ and $\overline{2^0}$ outputs are sent to the random access multiplexer V and turn on a specific channel within the pair of 1-out-of-8 decoders. The $\overline{2^2}$, $\overline{2^1}$ and $\overline{2^0}$ outputs are inverted in the address encoder W to obtain the $2^2$, $2^1$ and $2^0$ bits of the channel select command.

The condition responsive devices being monitored are coupled to respective channels so that data at the input of the turned on channel frequency modulates a vacuum control oscillator VCO whose output is transmitted to the master control station by the transmitter T. The address encoder W is not used at this time.

At the master control station (FIG. 1), the parity indication occurs as before. The data transmission is routed from the receiver 13 to a discriminator X where it is detected then recorded by one channel of a multipen recorder Y.

The next function to be described is the read function. The read function verifies that the data displayed on the recorder Y is from the channel indicated by the channel select switches 16. The read function can be repeated as often as desired without interfering with the data display. The read command is initiated by depressing a read switch 19. The control logic circuit C generates a parity reset pulse and a read pulse. The read pulse is applied to the command encoder D to produce the read command (111111 and the parity bit)). The read command is applied to the oscillator driver E where it gates through the 11.5, 9.3, 7.6, 6.3, 5.2, 4.25 and 3.5 kHz tones from the frequency sources 20 through 20F, respectively. These tones are then transmitted by the transmitter R to the hydrogen hazards multiplexer.

The tones are received by the receiver 11 at the hydrogen hazards multiplexer (FIG. 2), extracted by filters 12, detected by detector F and applied to the driver G. The outputs of the driver (111111 and the parity bit) are applied in parallel to the parity correlator H, command verification and command reset I, and storage register J. Again parity is generated and transmitted to the master control station by the transmitter T. The parity output of the correlator H and the $2^5$, $2^4$, $2^3$, $2^2$ and $2^1$, and $2^0$ bits are now used in the command verification and command reset circuit I to generate the verified command. Since no strobe outputs are produced, the read command does not effect the storage register J.

The verifying command is applied to the address encoder W along with the $\overline{\mathbf{8}}$, $\overline{\mathbf{16}}$, $\overline{\mathbf{24}}$, $\overline{\mathbf{32}}$, $\overline{\mathbf{40}}$, $\overline{\mathbf{48}}$ and $\overline{\mathbf{56}}$ outputs of the command decoder U. These outputs are decoded by the address encoder W to obtain the $2^5$, $2^4$ and $2^3$ bits of the channel select command. The $2^2$, $2^1$ and $2^0$ bits are inverted by the address encoder W. The output of the address encoder is identical to the binary number of the channel stored in the storage register J and is sent to the oscillator driver S. The verified command along with the bits of the binary number then gate appropriate tones from the frequency sources 19 or 19F through the oscillator driver S for transmission by the transmitter T to the master control station.

At the master control station the tones are received by the receiver, extracted by filters 14, detected by the detector M, inverted by the inverter N, and applied to the storage register A. The parity indication occurs as before. The $2^5$, $2^4$, $2^3$, $2^2$, $2^1$ and $2^0$ bits are read into the storage register A which produces the complement of the binary at its output. Each output is then compared bit by bit with the binary number from the BCD/binary converter Q in the comparator B. If the binary number from the storage register A is the complement of the binary number from the BCD/binary converter Q, and a 1 output is produced at the output of the comparator B. This output is applied to the lamp driver 17 illuminating the read indicator light.

The following contains the theory of operation of the system on a detailed logic level. This theory of operation is presented by tracing the various commands (in proper sequence) through the system. The master control theory is presented first, then followed by the hydrogen hazards multiplexer station. Since each master control station has five identical multiplexer control sections, only one section is described. It should also be noted that the hydrogen hazards multiplexer stations which form the remote station differ only in the number of channels available.

In this description, 1 and 0 are used to designate logic levels. A 1 represents a plus 5 volts, while a 0 represents 0 volts. In some cases a 1 may also be represented by an open or unconnected input. Reference to the logic elements are made by assembly designations, integrated circuits modules designation, and specific logic elements when necessary. The letter character preceding the reference number indicates the location of the component within the circuit. For example, A30 indicates that clear flip-flop 30 is located in storage register A.

Figure 3:
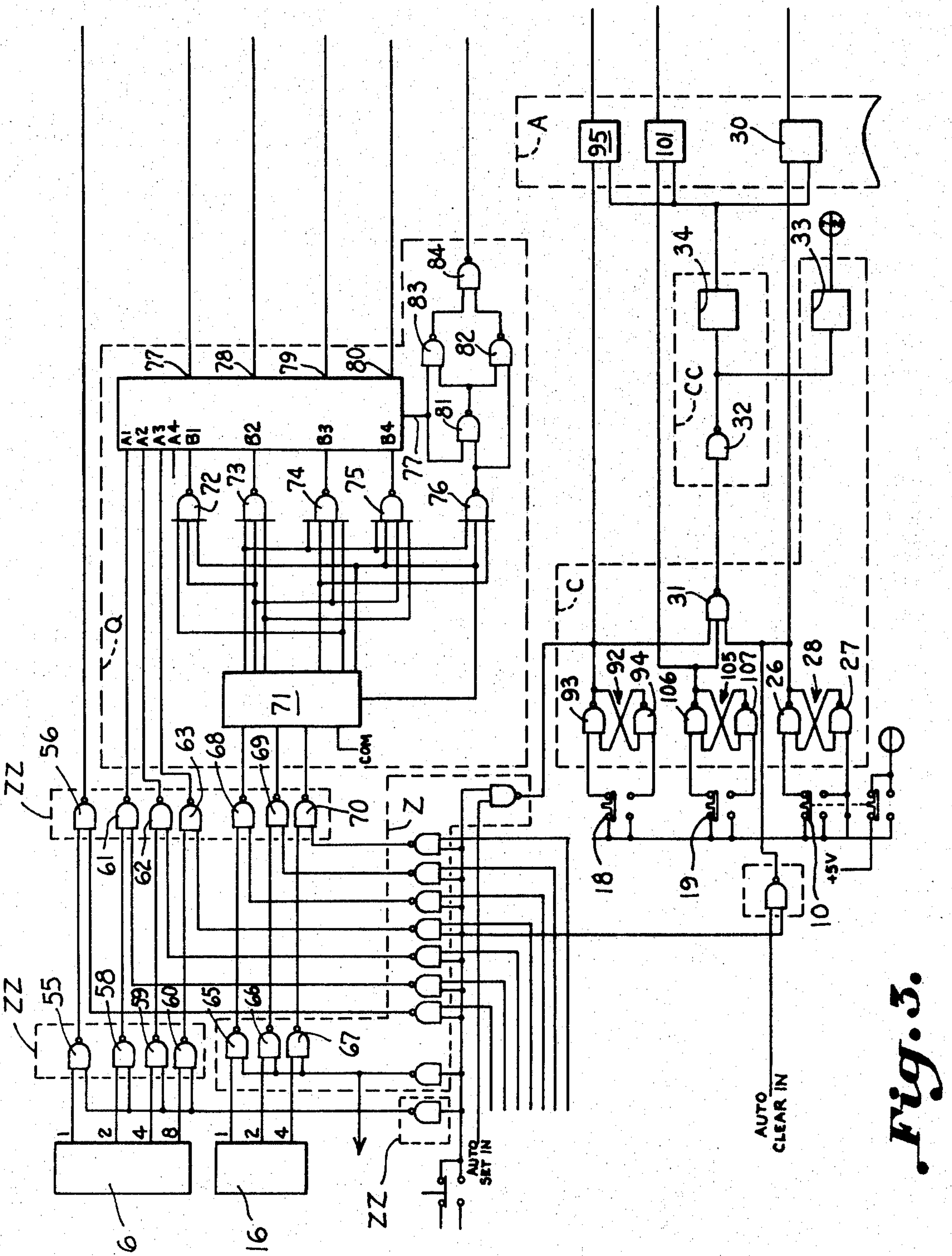
FIGS. 3, 3A and 3B are a detailed logic diagram of the master control station.
Figure 3A:
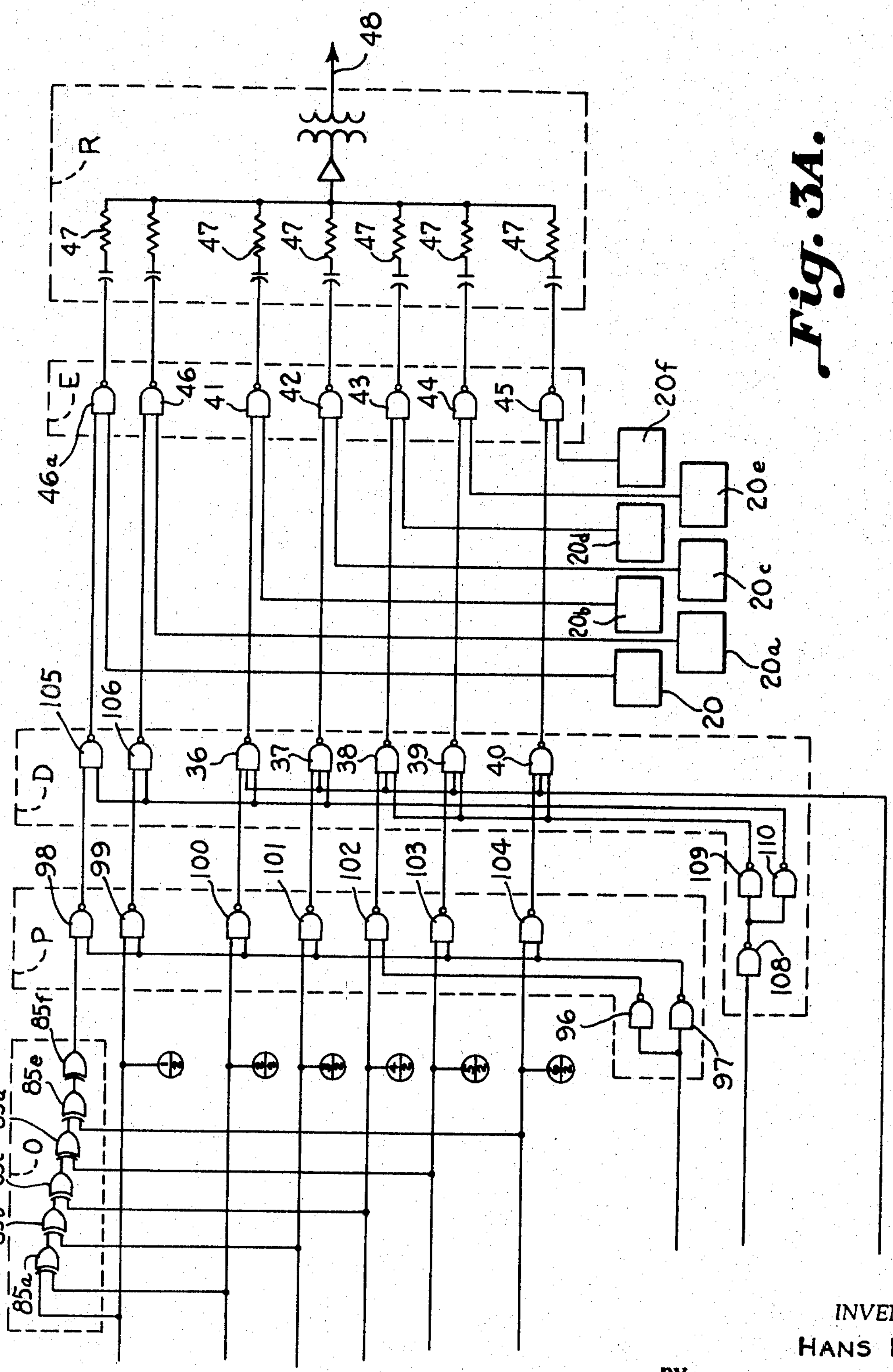
Figure 3B:
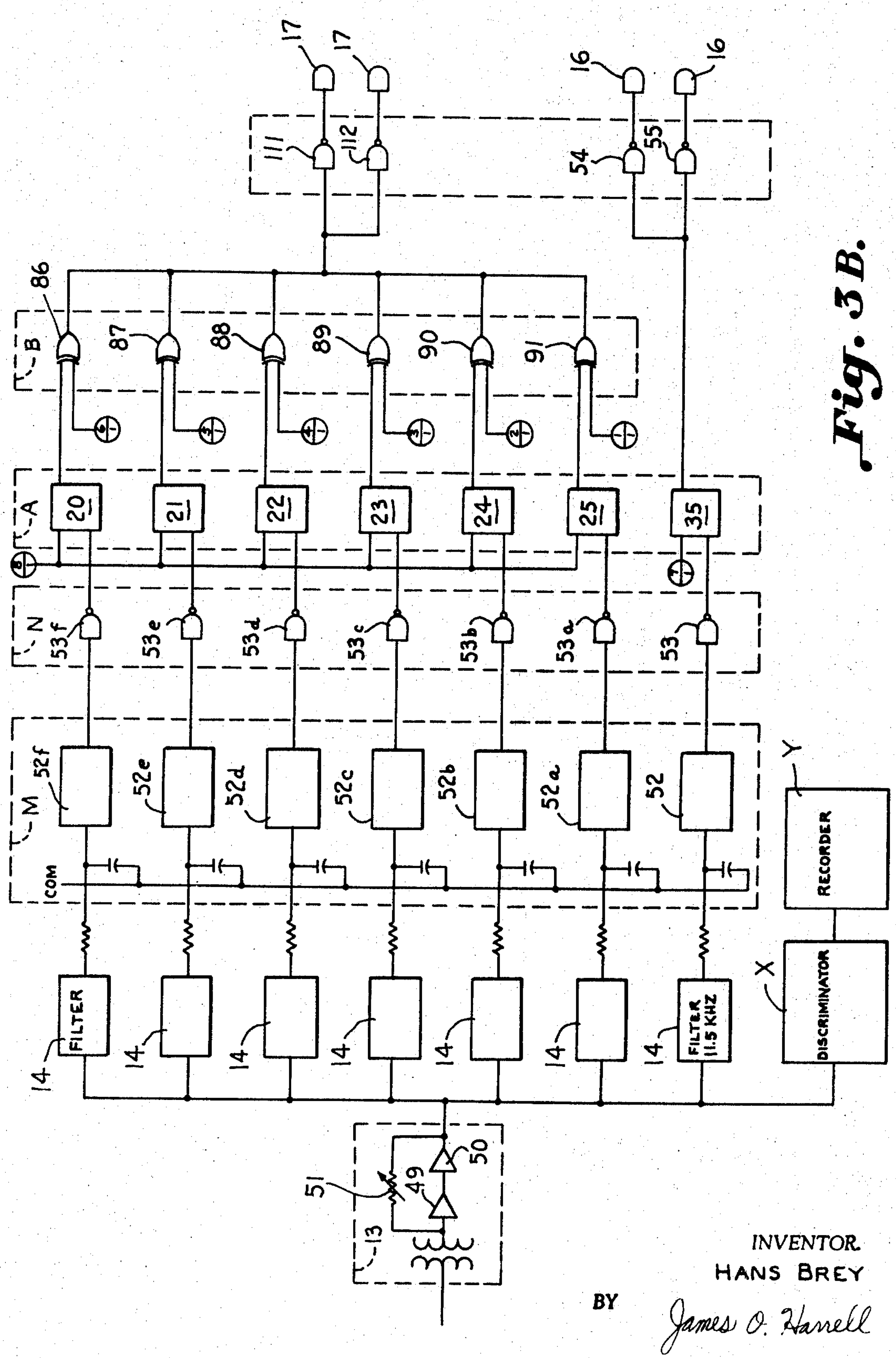

Referring now to FIGS. 3, 3A, and 3B, the theory of the operation on a detailed logic level of the master control station will be described. First, the clear function is described. The clear command is a 500-ms. multitone burst consisting of the 9.3, 7.6, 6.3, 5.2 and 4.25 kHz tones and is initiated by depressing the clear switch 10. One section of the clear switch clears command bit flip-flops A20, A21, A22, A23, A24, and A25 in the storage register A producing a 1 at the 0 output of each flip-flop. The other section of the clear switch 10 switches a flip-flop composed of cross-coupled NAND gates C26 and C27 on switch buffer C. This flip-flop, generally designated by the reference character 28, produces a 0 as long as the clear switch 10 is depressed. The 0 switches a clear flip-flop A30 and is also applied to gate C31.

Gate C31 produces a 1 which is inverted by gate CC32 in a one shot and lamp driver CC. The 0 from gate CC32 triggers two one short multivibrators CC33 and CC34. One shot multivibrator CC33 produces a 0 output for about 150-ns to clear or reset the parity flip-flop A35. At this time a set indicator light 16 should extinguish; however, in normal operation this "off" period "about 160-ms" may not be noticable. One shot multivibrator CC34 produces a 1 output for 500-ms to insure that clear flip-flop 30 produces a 0 for 500-ms.

The 0 from flip-flop A30 is applied in parallel to gates D36, D37, D38, D39 and D40 of command encoder D. The outputs of these gates go to 1 and are applied to associated gates E41 through E45, respectively, of the oscillator driver E. Gates E41 through E46 gate through the 9.3, 7.6, 6.3, 5.2 and 4.25 kHz tones from the oscillators 20 through 20F. Each gate in the oscillator driver E produces a 0 when the oscillator input goes positive and a 1 when the oscillator input goes negative. The result is square wave at the oscillator frequency varying from 0 to plus 5 volts. If the command encoder D input is 0, such as at gate D40, the output of the gate remains at the plus 5 volt or one level. The tones are then added linearily in the transmitter R by the resistor capacitor networks 47 and transmitted by transmitter R to the remote station hydrogen hazards multiplexer over a twisted pair telephone line 48. The details of the transmitter is not discussed for the reason that such can be any conventional suitable transmitter.

The hydrogen hazards multiplexer shown in FIGS. 6, 6A and 6B transmits a parity tone (11.5 kHz) back to the master control station if there is no single bit error in the command. The 11.5 kHz tone is amplified in the receiver 13 by amplifier 49 and fed through emitter follower 50 to the 11.5 kHz filter 14. Variable resistor 51 is adjusted for a receiver output of 1.4 Vrms per tone. Resistor 51 compensates for differences in transmission line lengths and is an installation. The 11.5 kHz tone is filtered by filter 14, integrated for about 80 ms to reduce the probability of bit error and converted to a 1 by detector M52. This 1 is inverted by gate N53. The 0 out of gate N53 switches the parity flip-flop A35, producing a "1" at the 0 output. This 1 is inverted by gates 54 and 55, illuminating the set indicator light 16.

The channel selection is made by manipulating thumb operated channel select switches 16. Two switches (one for units and one for tens) are used. Each switch gives an electrically coded output for each position. However, only seven positions (0 through 6) of the tens switch are used. The electrically coded outputs of these positions are identical to corresponding positions on the unit switch. There are no floating outputs for these switches. All outputs are either at the 1 or 0 level. The $2^0$ output of the unit switch is sent through gates ZZ56 and ZZ57 to parity generator 0 (FIG. 3A), channel encoder P and comparator B. The outputs from pins 2, 4 and 8 of the unit switch are sent through gates ZZ58, ZZ59 and ZZ60, ZZ61, ZZ62 and ZZ63 to a four bit binary adder 64 in the BCD/binary converter Q. The outputs from the tens switch go through gates ZZ65, ZZ66, ZZ67, ZZ68, ZZ69 and ZZ70 to the 1-out-of-10 decoder Q71. The outputs of the 1-out-of-10 decoder Q71 are then decoded by decoding gates Q72, Q73, Q74, Q75 and Q76 to produce the binary equivalents of 0, 10, 20, 30, 40, 50 or 60. The binary number produced depends on the setting of the "tens" switch 16.

The outputs of the decoding gates Q72 through Q76 are then fed to the four bit adder Q64 where they are binarily added with the 2, 4 and 8 outputs of the unit switch 16 to produce the channel select command. The outputs of the four bit adder Q64 forms the $2^1$, $2^2$, $2^3$ and $2^4$ bits of the channel select command. The $2^0$ bit comes directly from the unit switch 16. Outputs from the 1-out-of-10 decoder Q71 and the output Q77 from the four bit adder 64 are used to generate the $2^5$ bit. As long as the outputs of the gates Q76 and Q77 are 0 no $2^5$ bit is produced. If either output goes to 1 the $2^5$ bit is generated. For example, assume channel 32 is selected. The inputs to the four bit adders Q64 from the unit switch 16 or 1 to A1 input, 0 to A2 input and 0 to A3 input. A4 input is always at the 0 level. The four bit adder inputs from the decoding gates 72 through 75 are 1 to B1, 1 to B2, 1 to B3 and 1 to B4. First, the A1 and B1 inputs (1 and 1) are added binarily producing a 0 at the output 79 and carrying a 1. Carries are accomplished internally in the four bit adder. The inputs A2 and B2 and the carried 1 are now added producing a 0 at output 78 and carrying a 1. Next the A3 and B3 inputs (0 and 1) and the carried 1 are added producing a 0 at output 79 and carrying a 1. The A4 and B4 inputs (0 and 1) and the carried "1" are then added producing a 0 at the output 80 and a 1 at the output 77. At this point the output of gate Q76 is 0 and is applied to gates 81 and 82. The 1 from the output 77 is applied to gates Q81 and Q83. Gate Q81 produces a 1 which is applied to gate Q83 and Q82 producing a 0 and 1 respectively. The 0 and 1 inputs to gate Q84 produces a 1 which is the $2^5$ (32) bit. The output 77 of the four bit adder 64 goes to 1 for channel select commands 32 through 39. For channel select commands 40 through 60 the 1 is produced by gate Q76. The $2^1$, $2^2$, $2^3$, $2^4$ and $2^5$ outputs are then applied to the parity generator O, channel encoder P and comparator B along with the $2^0$ output. The parity generator O consists of a series of exclusive OR gates *85a*, *85b*, *85c*, *85d*, *85e* and *85f*, and performs a module two addition of the bits in the channel select command to generate a parity bit. This output is a 1, if the channel select command contains an odd number of 1. The parity bit is then applied to gate P98 in the channel encoder. The bits composing the channel select command are also applied to the channel encoder D. However, the channel select command is not gated through at this time.

Each bit of the channel select command is also applied to an exclusive OR gate B86 through B91 in the comparator B. At this time each exclusive OR gate B86 through B91, has a 1 from a flip-flop A20 through A25, in the storage register A (sees from clear function) and one bit of the channel select command. Under these conditions, a 0 is produced at the output of the comparator B. With a 0 output from the comparator the read indicator light 17 is extinguished.

The set function will now be described. The set function allows the channel select command to be transmitted to the hydrogen hazards multiplexer. Depressing the set switch 18 causes the flip-flop generally designated by the reference character C92 composed of cross-coupled NAND gates C93 and C94 forming part of the control logic circuit C to switch, producing a 0 output. This 0 switches flip-flop A95 in the storage register A and is also applied to gate 31 which produces a 1 output. This 1 is used to generate the 150 ns output to clear the parity flip-flop A35 and a 500 ms output to the set flip-flop A95 in the same manner as in the clear function. Flip-flop A95 goes to the 0 level for 500-ms. This 0 is inverted by gates P96 and P97 in the channel encoder P. Gates P96 and P97 apply a 1 to gates P98 through P104. Gates that have 1 inputs from the BCD/binary converter Q now produce a 0 while gates with the 0 inputs remain at the 1 level.

The channel encoder P outputs are applied to corresponding gates D105, D106, D36, D37, D38, D39 and D40, respectively, in the command encoder D. The other inputs to the command encoder D are normally at the 1 level; therefore, a 0 from the channel encoder P produces a 1 out and 1 produces a 0. The outputs of the command encoder D are applied to the oscillator driver E and gate through the appropriate oscillator tones by means of gates 41 through 46 and *46a* from the frequency sources 20 through 20F as in the clear function. Again the command is transmitted by the transmitter R to the hydrogen hazards multiplexer for 500-ms.

At this time, the hydrogen hazards multiplexer located at the remote station and sends the parity tone (11.5 kHz) back to the master control station to give the parity indication as in the clear function. In addition, data from the selected channel is received and fed to a discriminator X. The output of the discriminator is recorded on one channel of the recorder Y.

The read function will now be described in detail.

The read function insures that the correct channel has been selected. Depressing the read switch 19 switches a flip-flop, generally designated by the reference character C105 which is composed of cross-coupled NAND gates 106 and C107 forming part of the control logic circuit C. The 0 output of the flip-flop 105 switches flip-flop A101 in the storage register A, and is used to produce the 150-ns and 500-ms pulses as in the clear function. The 150-ns pulse clears the parity flip-flop 35, extinguishing the parity indicator light 16. The 500-ms pulse insures that the output of the flip-flop A107 stays at 0 for 500-ms. This 0 is inverted by gate D108 in the command encoder D. The 1 output of gate D108 is inverted by gates D109 and 110, producing 0 outputs from these gates. The 0 input to gates D105, 106, 36, 37, 38, 39 and 40 cause the outputs of these gates to go to a 1. These 1 inputs to the oscillator driver E gate through the 9.3, 7.6, 6.3, 5.2, 4.25, 3.5 and 11.5-kHz tones from the tone generators 20 through 20F. This command is transmitted to the hydrogen hazards multiplexer by the transmitter R in the same manner as the clear function. The hydrogen hazards multiplexer now transmits a 500 ms. multitone burst consisting of the tones composing the channel select command and the parity tone to the master control station. This multitone burst is received and applied in parallel to the filters 14. The parity indication is given in the same manner as for the clear function. Each of the remaining filters extracts a tone (if present) and applies it to a detector 52 through 52F in the detector circuit M. The tone is integrated for 80-ms by the integrating circuit associated with the detector, converted to a 1 level and routed through an inverter N consisting of inverters 53 through 53F to a flip-flop in the storage register A as in the clear function. Where a tone is present, its associated flip-flop in the storage register A switches producing a 0 at its output. This 0 is then applied to an exclusive OR gate in the comparator B. If the channel select commands from the hydrogen hazards multiplexer is identical to the channel select command from the master control station, each exclusive OR gate in the comparator B will have 1 and 0 inputs and the output of the comparator goes to a 1. This 1 is inverted by gates 111 and 112 on the one-shot and the lamp driver, illuminating the read indicator lamp 17. If the bit is missing, the associated exclusive OR gate will produce a "zero" causing the comparator B output to go to 0. This 0 will not allow the read light to be illuminated. An extra 1 from the hydrogen hazards multiplexer produces the same results. It should be noted that the read function does not effect data transmission and can be performed as often as desired.

The detailed theory of operation of the hydrogen hazards multiplexer will be discussed next. First the clear function will be described.

The clear command from the master control station is a multitone 500-ms burst consisting of the 9.3, 7.6, 6.3, 5.2, and 4.25 kHz tones. This multitone burst is amplified by the receiver 11. A variable resistor 113 is adjusted for a receiver output of 1.4 Vrms. per tone. Resistor 113 compensates for differences in transmission line lengths and is an installation adjustment.

The receiver 11 output is identical to the receiver in the master control station, therefore, like reference characters are utilized. The receiver output is applied in parallel to seven filters 12. Each filter is tuned to a specific tone and extracts that tone from the multitone burst. Each tone is sent to a detector F114 on the detector circuit F. Each tone is integrated by an integrating circuit 115 for about 80 ms. to reduce the probability of a bit error, then then converted to a 1 level. At this point the $2^5$, $2^4$, $2^3$, $2^2$ and $2^1$ bits are at the 1 level, while the $2^0$ and parity bits are at the 0 level. The output of each detector 114 is then applied to a driver G which presents a constant load to the detector G. The output of each driver is applied to the parity correlator H, command verification and command reset I, and storage register J. The parity correlator performs a modulo two addition of the bits to generate the parity and $\overline{\text{parity}}$ outputs. For the clear command the $2^5$ and $2^4$ bits (1 and 1) are applied to exclusive OR gate H116, producing a "zero" output. This 0 and the parity bit 0 are applied to exclusive OR gate H117 producing a 0 output which is applied to exclusive OR gate H118. The $2^3$ and $2^2$ bits (1 and 1) are applied to exclusive OR gate H119 producing a 0 output which is applied to exclusive OR gate H120. The $2^1$ (1) and $2^0$ (0) bits are applied to exclusive OR gate H121 producing a 1 output which is applied as a second input to exclusive OR gate H120. Exclusive OR gate H120 now produces a 1 output which is applied to exclusive OR gate H118 producing the parity and $\overline{\text{parity}}$ outputs. The parity output is applied to the command verification and command reset circuit I and to the oscillator driver S, while the $\overline{\text{parity}}$ output is applied to the command verification and command reset circuit I. The oscillator driver S allows the output of the 11.5 kHz oscillator 19 to be applied to the transmitter T for transmission to the master control station.

The command verification and command reset I uses the parity and $\overline{\text{parity}}$ input to generate a strobe pulse. The parity input to generate a strobe pulse. The parity input triggers one shot multivibrator I122 which produces a positive 50-ms pulse. The trailing edge of this pulse triggers one shot multivibrator I123 which produces a positive 200-ms pulse. This 200-ms pulse and the parity signals are then applied to gate 124 which produces a 0. This 0 is inverted by gate I125 and applied as a sixth input to gate I126, to the clock input CP of flip-flop I127 and to gate 128. The output of gate 126 now goes to 0 and is delayed, then inverted by gate I129. This 0 is applied to the direct reset RD input of flip-flop 127, locking its output at the 1 level. Since the negative swing at the CP input switches flip-flop 127, this input has no effect. The 200-ms input to gate 128 produces a 0 at its output. This 0 is applied to two gates, 130 and 131 in a driver to produce the two 200-ms strobe pulses. These strobe pulses are applied to storage register J. It should be noted that the RD input of flip-flop 127 returns to the 1 level at the end of the 200-ms pulse allowing it to be switched on the negative going edge of the next CP input pulse. After this a clear command must be generated again to produce strobe pulses, insuring that channels cannot be accidentally changed.

The bits present at the input of the storage register J are read into the storage register J. Each bit is read into the storage register in the same manner. For example, at flip-flop 122 a 1 representing the $2^5$ bit and the strobe pulse are applied to gate J132 producing a 0 output. The gate J133 receives this 0 and the strobe pulse, producing a 1 which is applied to gate J134. Gate J135 has a 0 applied from gate J132, producing a 1 at its outputs while gate 134 produces a 0 output. The gates 134 and 135 are cross coupled to latch them at these outputs. If the input to the storage register J is a 0 the opposite stages are produced. Each stage of the storage register J is identical to the stage which includes gates 132 to 135. It should be noted that although the outputs of the storage register are not used at this time, the outputs are decoded by the command and decoder U, and will turn on a channel in multiplexer V. This channel is not used for data transmission.

The set function will now be discussed.

Channel selection effects the hydrogen hazards multiplexer only when the set switch on the master control station is depressed. When the set switch 18 is depressed, multitone 50-ms burst is sent to the hydrogen hazards multiplexer. This multitone burst contains the tones representing the bits that form the binary number of the channel selected. This binary number is received by receiver 11, detected and read into the storage register J in the same manner as the clear command. A parity indication is also sent to the master control station in the same manner. The operation of command verification and command reset circuit I differs slightly. The strobe pulses are produced in the same manner; however, the RD input to flip-flop 127 is now at the 1 level. The trailing edge of the CP input now switches flip-flop 127, causing its output to go to 0. Flip-flop 127 cannot be switched again until another clear command is sent; that is, the RD input must go to 0 to switch flip-flop 127.

The $2^5$, $\overline{2^5}$, $2^4$, $\overline{2^4}$, $2^3$ and $\overline{2^3}$ outputs from the storage register J are decoded to turn on a specific pair of 1-out-of-8 decoders V136 through V136-0. The output of the command decoder that goes to 0 turns on the 1-out-of-8 decoders V-136 through V-136-P. The outputs of the command decoder U and $\overline{2^2}$, $\overline{2^1}$ and $\overline{2^0}$ outputs of the storage register J are all sent to the address encoder W which decodes the output of the command decoder U to obtain the $2^5$, $2^4$, and $2^3$ bits. The $\overline{2^2}$, $\overline{2^1}$, and $\overline{2^0}$ are inverted to obtain the $2^2$, $2^1$ and $2^0$ bits. These outputs form the binary number of the channels selected and are applied to the oscillator driver S. However, the inputs to the oscillator driver are not used at this time. The $2^2$, $2^1$ and $2^0$ outputs of the storage register J turn on a specific channel withing a pair of 1-out-of-8 decoders V in the multiplexer. The output of the sensor or condition responsive device (not shown) applied to the selected channel is now applied to a voltage control oscillator 137. The sensor input essentially frequency modulates the voltage control oscillator 137. With 0 in, the frequency of the voltage control oscillator 137 is 2.1275 kHz. At 1 volt, the VCO 137 is at its center frequency of 2.3 kHz and at 2.4725 kHz at 2 volts. The output of the VCO 137 is applied to the transmitter T for transmission to the master control station.

The next function described is the read function.

The read or verify command is a 500-ms multitone burst consisting of the 11.5, 9.3, 7.6, 6.3, 5.2, 4.25 and 3.5 kHz tones from the tone oscillators 20 through 20F. This command is received by the receiver 11, filtered by filters 12, detected by detector F in the same manner as the clear command and applied in parallel to the parity correlator H, command verification and command reset circuit I and storage register J. The parity and $\overline{\text{parity}}$ outputs are generated and the parity tone (11.5 kHz) is transmitted to the master control station as for the clear command.

Flip-flop I127 in the command verification and command reset circuit I cannot be switched and since its output is at 0 no strobe pulses are generated. Since no strobe pulses are generated, the read command is not read into the storage register J and does not interfere with data transmission.

The $2^5$, $2^4$, $2^3$, $2^2$ and $2^1$ and parity inputs to gate I126 of the command verification and command reset circuit I produce a 0 output which is inverted to the 1 level by gate I138 and applied to gate I139. Gate I139 also receives the $2^0$ input, producing a 0 output. The 0 from gate I139 is inverted to a 1 by gate W140 in the address encoder W. This 1 is then sent to the oscillator driver S. The gates of the oscillator driver (other than parity) require three inputs to produce an output. For each 1 in the channel select command, a 1 is applied to its associated gate. The verifier command input is common to all but the parity gate. When these two inputs are at the 1 level the output of its associated oscillator is gated through to the transmitter T. On the positive swing of the oscillator, the gate output goes to 0 and on the negative swing the gate output goes to the 1 level. The output is a square wave varying between 0 and plus 5 volts.

The transmission to the master control station is a multitone burst for about 200-ms, and is identical to the channel select command. The read function may be performed as often as desired.

What is claimed is:

1. A system for monitoring a plurality of condition responsive devices comprising:

A. a plurality of channels each being connected to a respective condition responsive device;

B. a master control station including:

a. a channel select means for selecting a particular channel to be monitored, b. a BCD/binary converter coupled to the output of said channel select means for generating an initial binary number indicating the channel selected by said channel select means;

c. a parity generator means coupled to the output of said BCD/binary converter for generating a parity signal when said initial binary number from said BCD/binary converter has an even number of "ones";

d. a first oscillator driver, e. a plurality of identifying sending frequency sources coupled to said oscillator driver, f. a master control transmitter coupled to an output of said first oscillator driver, g. means for coupling the output of said BCD/binary converter to said first oscillator driver, h. means for coupling said parity signal from said parity generator means to said first oscillator driver for gating frequencies according to said initial binary number through said first oscillator driver to said master control transmitter, i. said master control transmitter transmitting a frequency multiplexed signal comprising said frequencies from said oscillator driver, C. a remote station for receiving said multiplex signal from said master control transmitter comprising:
a. a receiver for receiving said multiplexed signal from said master control transmitter,
b. a first bank of filters coupled to said receiver for separating said multiplexed signal into a plurality of frequencies,
c. a first detector coupled to said bank of filters for converting said frequencies into a plurality of received binary signals,
d. a random access multiplexer having inputs coupled to respective channels being monitored,
e. means for supplying said received binary signals from said detector to said random access multiplexer for selecting a particular channel determined by said received binary signals,
f. a second oscillator driver,
g. a plurality of identifying receiver frequency sources coupled to said oscillator driver,
h. a remote station transmitter coupled to said second oscillator driver,
i. means for coupling an output of said random access multiplexer to said remote station transmitter for supplying a signal appearing on the selected channel to said transmitter,
j. means for supplying said received binary signals from said detector to said oscillator driver for gating frequencies determined by said received binary number from said receiver frequency sources to said remote station transmitter,
k. said remote station transmitter transmitting said frequencies from said receiver frequency sources and said signal appearing on said selected channel back to said master control station, D. means included in said master control station for receiving and recording said information transmitted back from said remote station transmitter, and E. means included in said master control station for converting said information received from said remote station to a returned binary number and comparing said returned binary number with said initial binary number for determining if an error occurred during transmission.

2. The system as set forth in claim 1, wherein said means in said master control station for converting said information received from said remote station to a returned binary number and comparing said returned binary number with said initial binary number includes,
A. a second bank of filters for separating said information transmitted back from said remote station into a plurality of returned frequencies,
B. a second detector for converting said returned frequencies into a plurality of returned binary signals, and
C. a comparator,
D. means for coupling said initial binary number and said returned binary member to said comparator for determining if an error occurred during transmission.

3. The system as set forth in claim 1 wherein: said plurality of sending frequency sources produce frequencies which are 1.21 multiples of each other so that no linear combination of any harmonics of any frequency pair will interfere with another frequency.

4. The system as set forth in claim 1 further comprising:
A. a first storage register forming a part of said master control station,
B. a clear function means coupled to said first storage register and said parity generator for resetting said storage register and causing said parity generator to generate a parity reset signal when activated,
C. means for coupling said parity reset signal to said first oscillator driver for gating a predetermining number of frequencies constituting a clear command from said frequency sources to said master control transmitter for transmission to said remote station,
D. a parity correlator forming a part of said remote station,
E. means for feeding said clear command to said parity correlator which generates an error indicating signal, and
F. means for coupling said parity error indicating signal to said second oscillator driver for gating a signal from said received frequency sources to said remote station transmitter for transmission back to said master control station for indicating whether there is an error in transmission.

* * * * *